US008812498B2

(12) United States Patent
Ingrassia, Jr. et al.

(10) Patent No.: US 8,812,498 B2
(45) Date of Patent: Aug. 19, 2014

(54) METHODS AND SYSTEMS FOR PROVIDING PODCAST CONTENT

(75) Inventors: Michael I. Ingrassia, Jr., Cupertino, CA (US); Benjamin A. Rottler, San Francisco, CA (US); Aram M. Lindahl, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 12/892,846

(22) Filed: Sep. 28, 2010

(65) Prior Publication Data
US 2012/0079017 A1 Mar. 29, 2012

(51) Int. Cl.
G06F 17/30 (2006.01)
G06F 17/00 (2006.01)

(52) U.S. Cl.
CPC .... G06F 17/30029 (2013.01); G06F 17/30761 (2013.01); G06F 17/30828 (2013.01); G06F 17/30817 (2013.01)
USPC .................. 707/732; 707/E17.014; 709/204; 700/94

(58) Field of Classification Search
CPC .................. G06F 17/30029; G06F 17/30761; G06F 17/30828; G06F 17/30817
USPC .................. 707/999.107, 722, 737–738, 769; 704/1; 386/224; 725/35, 86, 117, 34, 725/44–46; 715/836, 200–202, 719, 723, 715/810; 1/1; 209/204, 231; 369/30.08; 709/219, 227, 203–204; 719/202, 719
See application file for complete search history.

(56) References Cited

U.S. PATENT DOCUMENTS

| 6,289,165 | B1 * | 9/2001 | Abecassis | 386/224 |
| 7,257,774 | B2 * | 8/2007 | Denoue et al. | 715/719 |
| 7,686,215 | B2 | 3/2010 | Jones et al. | |
| 8,244,171 | B2 * | 8/2012 | Ingrassia et al. | 455/3.04 |
| 2001/0023436 | A1 * | 9/2001 | Srinivasan et al. | 709/219 |

(Continued)

FOREIGN PATENT DOCUMENTS

WO   WO 2009/026159 A1 * 2/2009
WO   2009/045560 A2   4/2009

OTHER PUBLICATIONS

Resnick et al, "GroupLens: An Open Architecture for Collaborative Filtering of Netnews" from Proceedings of ACM 1994 Conference on Computer Supported Cooperative Work, Chapel Hill, NC: pp. 175-186.*

(Continued)

Primary Examiner — Wing F Chan
Assistant Examiner — Raji Krishnan
(74) Attorney, Agent, or Firm — Novak Druce Connolly Bove + Quigg LLP

(57) ABSTRACT

A podcast parsing application is disclosed which may provide podcast content of interest to a user. The podcast parsing application may generate a compilation of podcast content from a plurality of podcasts. When playing a podcast to a user, the podcast parsing application may identify portions of podcast content and provide only those portions of the podcast determined to be of interest to the user. Information derived from user input, metadata tags, viewing histories, popularity data, search results, audio processing techniques or other information sources may be used by the podcast parsing application to distinguish, identify or otherwise provide podcast content of interest to the user.

12 Claims, 11 Drawing Sheets

(56) References Cited

U.S. PATENT DOCUMENTS

| | | | |
|---|---|---|---|
| 2003/0182100 A1* | 9/2003 | Plastina et al. | 704/1 |
| 2004/0078470 A1* | 4/2004 | Baumeister et al. | 709/227 |
| 2005/0022234 A1* | 1/2005 | Strothman et al. | 725/34 |
| 2006/0156219 A1* | 7/2006 | Haot et al. | 715/500.1 |
| 2006/0190616 A1 | 8/2006 | Mayerhofer et al. | |
| 2006/0268667 A1 | 11/2006 | Jellison, Jr. et al. | |
| 2007/0106693 A1* | 5/2007 | Houh et al. | 707/104.1 |
| 2007/0130594 A1 | 6/2007 | Hidary et al. | |
| 2008/0046948 A1* | 2/2008 | Verosub | 725/117 |
| 2009/0320075 A1* | 12/2009 | Marko | 725/56 |
| 2010/0205228 A1* | 8/2010 | Reese | 707/805 |
| 2010/0268361 A1* | 10/2010 | Mantel et al. | 700/94 |
| 2011/0161348 A1* | 6/2011 | Oron | 707/769 |
| 2012/0272126 A1* | 10/2012 | Atkins et al. | 715/202 |

OTHER PUBLICATIONS

He et al, "Auto-summarization of audio-video presentations" from Proceedings of ACM Multimedia '99, pp. 489-498.*

Correia et al, "Active Video Watching using Annotation" from Proceedings of ACM Multimedia '99, pp. 151-154.*

* cited by examiner

900

| Compilation Title: | Commute Podcast | 910 |
| Compilation Length: | 25:00 | |
| Metadata Keywords: | Who's Carl This Time | |
| Title Keywords: | NPR | |
| Genre: | All | |
| Date Range: | 07/01/2010 - Present | |

920

| 930 | 922 | 924 | 926 | 928 |
|---|---|---|---|---|
| ◄ | Podcast | Author | Length | Tagging |
| | NPR: Wait... (07/31/2010) | NPR | 47:11 | Segment Title ▲ |
| | NPR: Wait... (07/24/2010) | NPR | 47:37 | Segment Title |
| | NPR: Wait... (07/17/2010) | NPR  932 | 46:48 | Segment Title |
| | NPR: Wait... (07/03/2010) | NPR | 47:23 | Segment Title |

934

| 936 | 938 | 940 | 942 | 944 | 946 |
|---|---|---|---|---|---|
| Add ▼ | Delete ▼ | Compile ▼ | Tag ▼ | info | help |

Podcast Information

Podcast: NPR: Wait Wait... Don't Tell me (07/31/2010)  950
Tagging: Segment Title (9)

956   952

1  2  3  4  5  6  7  8  9

0:00 ━━━━━━━━━━━━━━━━━━━━━━━━━━━━ 47:11

00:31  07:10 11:30  18:00   28:30   34:00 38:58  45:30

958   954

| 960 | 962 | 964 | 966 | 968 | 970 |
|---|---|---|---|---|---|
| Add ▼ | Delete ▼ | Extract ▼ | Tag ▼ | info | help |

Portion Information

Podcast: Who's Carl This Time? [00:31 – 7:00]; Portion 2
Tagging: Segment Title                                    980

| Compilation Parameters | Extraction Parameters | Podcasts | Compilation |

FIG. 9

METHODS AND SYSTEMS FOR PROVIDING PODCAST CONTENT

The present disclosure is directed towards podcasts. More particularly, the present disclosure is directed towards providing podcast content of interest.

BACKGROUND

Podcasts are sharable media content, typically provided in episodic format for users to download. Podcasts are an increasingly popular medium for distributing and updating content over the internet. Podcasts are available from provider websites, and are typically provided to users or subscribers as Really Simple Syndication (RSS) feeds. Various user devices can be used for receiving these RSS feeds, and are adapted for providing audio output, video output or both to users.

There exist a large number of podcast options from which a user can make selections for consumption. Because only some portions of a podcast may actually interest a particular user, the user is often required to spend time and effort searching for these portions of interest. It would be desirable to provide ways in which the portions of interest are provided to the user that require less effort by the user.

SUMMARY

This disclosure relates to systems and methods for providing podcast content to a user using a podcast parsing application. In some embodiments, the podcast parsing application may automatically provide to the user podcast content that is determined to be of interest to the exclusion of content that is determined to not be of interest. The parsing application may do this using, for example, preference information either automatically determined using processing equipment or defined by the user.

BRIEF DESCRIPTION OF THE DRAWINGS

FIG. 9 shows an illustrative compilation podcast display interface in accordance with some embodiments of the present disclosure;

DETAILED DESCRIPTION

Figure 1:
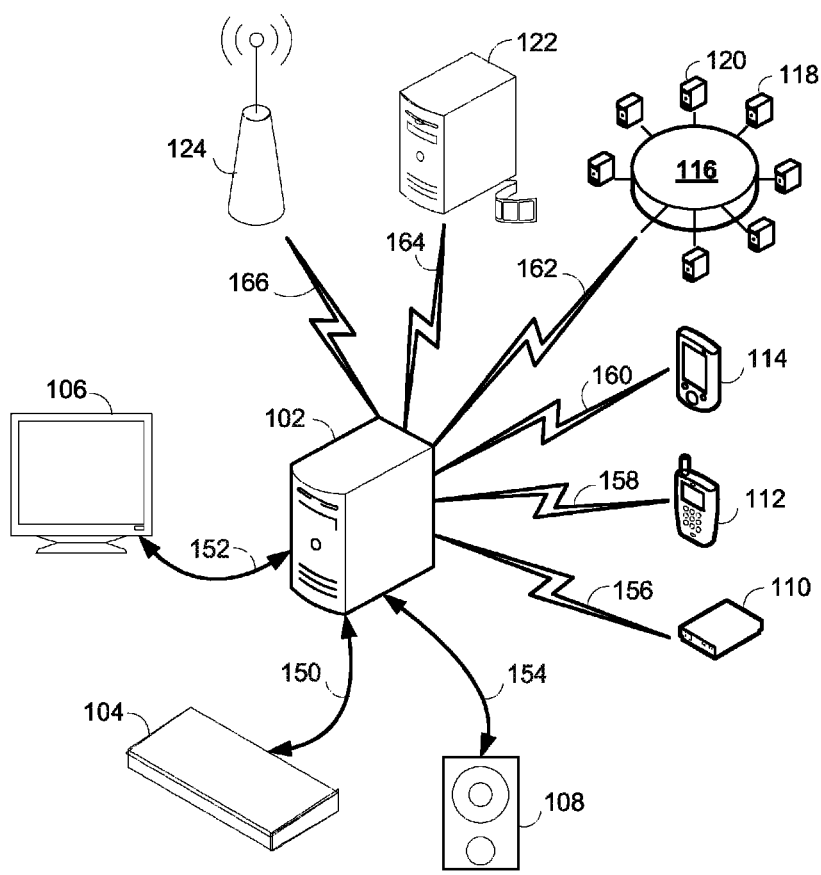
FIG. 1 is a diagram of an illustrative media delivery system in accordance with some embodiments of the present disclosure.

The present disclosure is directed to a podcast parsing application for parsing one or more podcasts and for performing one or more actions on particular portions of the podcasts. For example, the podcast parsing application may identify portions of interest within particular podcasts. A "portion" of a podcast refers to at least a subset of content included within the podcast, and may be designated by a time interval. The podcast parsing application may process any type of podcast, and any type of podcast portion. The podcast parsing application as discussed below may be implemented using any suitable combination of software, hardware, or both.

In some embodiments, the podcast parsing application may create a compilation of podcast content. Compiling will be understood to mean concatenating, or arranging in series, podcasts or portions of podcasts thereby forming a new podcast. Compiling podcast content, portions of podcast content, or combinations thereof, may provide a technique for delivering desirable content to a user. In some approaches, compilations may be generated based on user input, may be manually assembled by a user, or both. For example, a user may specify content of interest by manually selecting portions of podcasts. The user may also input keywords, preference information, any other suitable indicators, or any combination thereof to the podcast parsing application for searching podcast content. In some approaches, the podcast parsing application may generate compilation podcasts using, for example, information provided by the user, automated processes, or both. The user input, output of automated processes, or both may be used by the podcast parsing application to, for example, identify podcasts and podcast portions to use in the compilation. User input, automated process output, or both may be used in setting any suitable parameters for the generation of the compilation, such as, for example, playback length, portion transitions, playback arrangement of portions, and other suitable parameters, or any combinations thereof. Automated processes (i.e., processes performed independent of user input) for compiling podcast content may be based on accumulated viewing histories, user generated ratings, viewer preferences, statistical information based on viewers' behavior, or any other information available to the processing equipment used by the podcast parsing application. For example, in some embodiments the podcast parsing application may provide a compilation of the most popular or most viewed podcast portions featuring a particular celebrity.

In some embodiments, the podcast parsing application may exclude portions of podcasts from the compilation. Excluding will be understood to mean distinguishing a portion of podcast content from a remainder of podcast content, and restricting the distinguished portion from further action or inclusion. In some embodiments, the podcast parsing application may access content tags or other metadata associated with content to distinguish amongst podcast portions or identify portions of interest. The parameters used by the podcast parsing application for generating a compilation podcast are referred to here collectively as "compilation parameters".

In some embodiments, the podcast parsing application extracts portions of podcasts. Extracting will be understood to mean distinguishing a portion of a podcast from a remainder of the podcast, and providing the distinguished portion for further action. Extraction includes, but is not limited to, removal, separation, and retrieval of portions of podcast content. Extraction of podcast content may allow for content of interest to be separated from content that is not of interest.

In some approaches, the podcast parsing application may extract portions of podcast content based on user input, including providing options to a user for selecting or specifying a portion of a podcast. In some approaches, the podcast parsing applications may use keywords or other indicators for searching and extracting podcast content. Keywords and other indicators may be based on user inputs (e.g., text entered into a prompt), viewer profiles (e.g., viewer preferences or viewing history), statistical parameters (e.g., most popular keywords or searches), any other indicators, or combinations thereof.

In some approaches, the podcast parsing application may extract portions independent of user input (i.e., automatically), or by a combination of user input and automated processes. The podcast parsing application may use the processing equipment to automate processes based on accumulated viewing histories, user generated ratings, viewer preferences, statistical information based on viewers' behavior, or other information types or combinations thereof. For example, the podcast parsing application may extract the most popular or most viewed portion of a podcast.

In some embodiments, the podcast parsing application may extract podcast portions based on metadata tags. For example, the podcast parsing application may allow a user to request a portion of a podcast associated with a particular topic, and extract a portion of podcast content associated with a tag related to the requested topic. In some embodiments, the podcast parsing application may allow the user to tag extracted content. In some embodiments, the podcast parsing application may create metadata tags for extracted content independent of user input (i.e., automatically). Tagging will be understood to mean adding, appending or otherwise editing descriptive information or indicators (i.e. tags) associated with a particular podcast or particular portion of podcast content in a suitable data file such as a podcast content file, metadata file, any other suitable data file or any combination thereof. The parameters used by the podcast parsing application for extracting a portion of a podcast are referred to here collectively as "extraction parameters".

In some embodiments, the podcast parsing application may include extracted content in a separate podcast or podcast compilation. In some embodiments, the podcast parsing application excludes or skips portions of a podcast during playback. In some embodiments, the podcast parsing application may extract one or more desired portions of content, and may exclude one or more undesired portions from extraction based on metadata tags. In some approaches, the podcast parsing application skips certain tagged portions during playback of a podcast. In some approaches, the podcast parsing application only plays certain tagged portions during playback. The podcast parsing application may also allow the user to select various options for the extracted portion including playback, extraction, storage, addition to a compilation, tagging, any other suitable action or combinations thereof.

In some embodiments, the podcast parsing application may employ hierarchy information for compiling or extracting portions of interest. Hierarchy information will be understood to mean a collection of one or more indicators that designate portions of podcast content by relevance or importance. Hierarchy information may be included in podcast metadata information. Hierarchy information may allow the podcast parsing application to sort, rank, identify, or otherwise distinguish among content of interest. Hierarchy indicators may be based on content details (e.g., content type, content source, content genre, creation date), viewer preferences, viewing history (e.g., most popular portion, most important portion, most recommended portion), any other suitable indicator or any combinations thereof. Hierarchy information may be designated by the podcast parsing application, one or more users, a podcast provider, a social networking web site, any suitable entity or any combinations thereof. For example, a particular user may want to consume only the most popular or highest rated portions of podcasts. The podcast parsing application may access hierarchy information to extract portions determined to be of the highest interest. In some approaches, the podcast parsing application uses hierarchy information to select portions for playback during a limited playback time interval. For example, a user may want to consume a particular hour-long podcast but have only twenty minutes of time to devote. The podcast parsing application may accordingly generate a twenty minute podcast by identifying the most relevant portions based on hierarchy information. In some approaches the hierarchy information may be used to select particular portions for playback from a large set of podcast portions that may be of interest. For example, a particular user may want to compile four portions of interest, but the podcast parsing application has identified more than four portions of potential interest. The podcast parsing application may then identify four portions for compiling based on hierarchy information.

Examples of podcast content include audio and video blogs, television programs, radio programs, internet programs, recorded events, concerts, songs, music videos, performances, speeches, monologues, interviews, discussions, news programming, advertisements, any other content types, along with combinations of content types. A single podcast may include more than one content type, and may feature more than one personality. Techniques to parse this large variety of content may be desirable. In one example, a particular user may be only interested in the editorial segments of a news program, and may wish to exclude other segments. In some embodiments, the podcast parsing application may compile the portions of various episodes of the news program including the editorial segments into a podcast, and may exclude portions that do not include the editorial segments. In some embodiments, the podcast parsing application extracts the portions of podcast content corresponding to the editorial segments of a podcast.

Within the various podcast genres and types, podcast media may include audio content, video content, or any combination thereof. Video content may include but is not limited to full motion video, video stills, images, graphics, text, animation, any other suitable video content or combinations thereof. Audio content may include speech, conversation, singing, music, sound effects, other sounds, or combinations thereof. For example, a particular user may be only interested in the segments of podcasts featuring the voice of a particular radio personality. In some embodiments, the podcast parsing application may compile the appropriate portions of various podcasts that include the radio personality of interest into a single podcast. In some embodiments, the podcast parsing application may extract portions of podcast content featuring the radio personality of interest. Some embodiments may employ audio processing techniques to distinguish between portions. Voice recognition or identification techniques may allow for podcasts to be parsed into portions based on which voice or voices are prevalent at certain intervals during the podcast. Intervals of a particular podcasts featuring music or speaking may also be distinguished from one another by the podcast parsing application. For example, a talk show podcast may feature music selections adjacent to conversations. The podcast parsing application may allow the user to skip the music interludes, such that only the conversations are played during playback.

The present disclosure is described more fully in the context of FIGS. 1-11 below.

Shown in FIG. 1 is a diagram of an illustrative media delivery system in accordance with some embodiments of the present disclosure. User device 102 may include processing equipment (e.g., a processor, parallel processors, local processor, remote processor, multiple processors), memory hardware, communications interfaces, any other hardware components, or suitable combinations thereof. User device 102 may be a computer (e.g., general computer, specific computer, personal computer, laptop computer, tablet computer, net book computer), remote facility (e.g., remote server, remote processing facility), personal communications device (e.g., mobile phone, smart phone, iPhone®), personal media device (e.g., MP3 player, iPod®, iPad®), personal digital assistant (PDA), any other suitable user device, or any combination of user devices thereof. In some embodiments, user device 102 may include client software and input/output (I/O) communication interfaces that accept RSS feeds. User device 102 may store downloaded media and applications locally.

User device 102 communicates with user input device 104 via communication path 150 which may be wired or wireless. User device 102 may be configured for receiving input from user input device 104. User input device 102 may be a keyboard, keypad, mouse, joystick, touchpad, touch-screen, remote control, voice activated command module, microphone, any other suitable user input device or any combination of devices.

Display device 106 provides a display output, and is coupled to user device 102 by communications path 152 which may be wired or wireless. Communications path 152 may employ an RCA-type interface, S-Video interface, video graphic array (VGA) interface, digital video interface (DVI), high-definition multimedia interface (HDMI), Video In Video Out (VIVO) interface, any other suitable display device interface, or any combination thereof. Display device 106 may be a computer monitor, television, video projector, LED screen device, LCD screen device, plasma screen device, CRT screen device, head-mounted display (e.g., video glasses), any other suitable display device or any combination thereof. Display device 106 may also be integral to user device 102 such as the screen associated with a laptop computer, mobile phone, tablet device, personal media device, or other user device the provides a display. User device 102 may include a video graphic card or graphics accelerator card to facilitate communication with display device 106.

Audio device 108 provides an audio output to the user, and may be coupled to user device 102 by communications path 154. Audio device 108 may be located in user device 102 or display device 106. Audio device 108 may be a speaker (e.g., stand-alone, device-mounted), stereo speaker system, headphones, loudspeaker, or any other suitable audio output device or any combination thereof. Audio device 108 may also include controls and an interface for adjusting volume, such as, for example, a volume adjust knob or mute button.

Portable memory device 110 may be used for storing or recalling data and applications, and may be coupled to user device 102, via communications path 156. Portable memory device 110 may be a portable hard drive, flash memory drive, MultiMediaCard (MMC), SecureDigital (SD) card, compact disk reading and writing device, zip drive, disk drive, any other suitable memory device, or combination thereof. Communications path 156 may be a universal serial bus (USB) coupling, MMC coupling, SD coupling, any other suitable communications path or any combination thereof.

Personal communication device 112 may be coupled to user device 102 via communications path 158. Personal communication device 112 may be a mobile phone, smart phone (e.g., iPhone®), personal digital assistant (PDA), any other suitable personal communication device, or any combination thereof. Personal communication device 112 may also communicate directly with network 116, podcast provider 118, remote user device 120, server 122, any other device coupled to a network or any combination thereof. Personal communication device 112 may also include memory hardware and may communicate with portable memory device 110.

Personal media device 114 may be coupled to user device 102 via communications path 160. Personal media device 114 may be a digital audio player (e.g., MP3 player), digital video player (e.g., iPod®), mobile phone, tablet device (e.g., iPad®), smart phone, or other suitable personal media device. Personal media device 114 may also communicate directly with network 116, podcast provider 118, remote user device 120, server 122, any other device coupled to a network or any combination thereof. Personal media device 114 may include memory hardware and may communicate with portable memory device 110.

Network 116 may be coupled to user device 102 via communications path 162. Communications path 162 may be an optical network, wired network, wireless network, internet, ethernet, any other suitable network or combinations thereof. Wired networks may include wide area networks (WANs), local area networks (LANs), any other suitable wired network or any combination thereof. Wireless networks may include wireless LANs (WLANs), wireless WANs (WWANs), WiFi networks (e.g., IEEE 802.11 standard), communications networks, or other suitable network or any combination thereof. Podcast provider facility 118 may also communicate with network 116 via any suitable communications path. Podcast providers may provide content to a user via the aforementioned various communications paths or networks. Remote user device 120 may also communicate with network 116 via any suitable communications path. In practice, system 100 may be duplicated for various users and user devices, in various physical locations, all communicating via network 116.

Server 122 communicates with user device 102 via communications path 164. Communications path 164 may be any aforementioned network type. Server 122 may be a data server, media server, application server, file transfer protocol (ftp) equipped server, any other server, collection of servers, or combination thereof. Server 122 may be capable of uploading, downloading, storing, securing, streaming, RSS feeding, accessing or otherwise providing or retrieving data to and from user device 102. Data may include media content, podcasts, metadata, applications, any other data, or combinations thereof. Podcast provider facility 118 may also use server 122 to provide or distribute podcast content, metadata, any other suitable data or any combination thereof.

Wireless network 124 is coupled to user device 102 via communications path 166. Communications path 166 may include WiFi, wireless area networks of any scale, or cellular telephone networks such as Global System for Mobile Communications (GSM), Personal Communications Service (PCS), or Mobile Web, or any other wireless communication network. Podcast provider facility 118 may also use wireless network 124 to provide or distribute podcast content, metadata, any other suitable data or any combination thereof.

Illustrative system 100 shown in FIG. 1 represents some embodiments of hardware systems used to distribute and consume podcasts. In some embodiments, user device 102 may include user input device 104, display device 106, and audio device 108 in a single device. In some embodiments, user device 102 may include, but is not limited to, any combination of hardware and communications paths shown in FIG. 1, or discussed in the context of FIG. 1.

Figure 2:
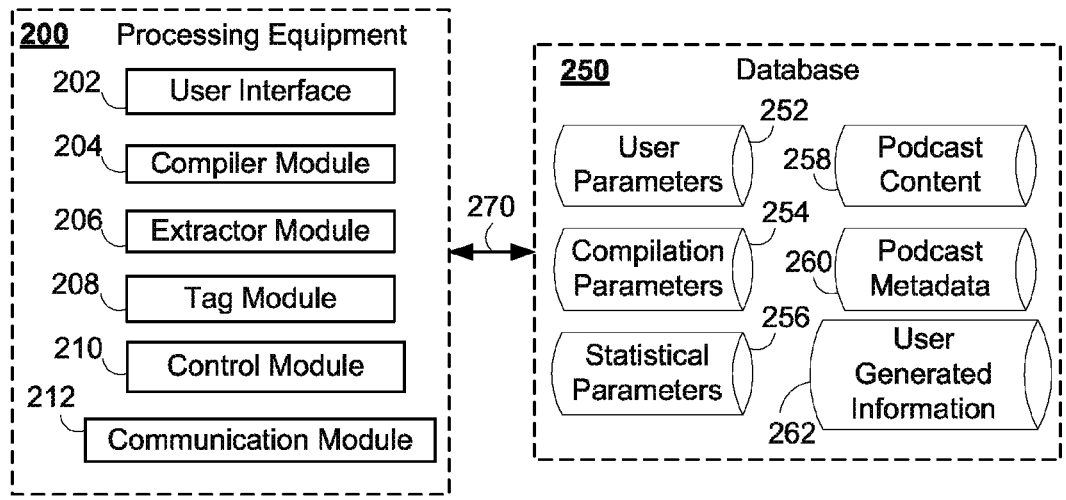
FIG. 2 is a block diagram of illustrative processing equipment and databases in accordance with some embodiments of the present disclosure.

Shown in FIG. 2 are illustrative processing equipment and databases in accordance with some embodiments of the present disclosure. Processing equipment 200 may be used to perform the actions described in the context of the podcast parsing application. Database 250 may be accessed by the processing equipment in the context of the podcast parsing application to store content, metadata, other suitable data or any combinations thereof. Processing equipment 200 may include a central processing unit (CPU) (e.g., microprocessor), collection of processors (e.g., parallel processors), CPU cache, random access memory (RAM), I/O communications interfaces, suitable circuitry, any other suitable processing elements or any combination thereof. Processing equipment may be included in a local device (e.g., user device 102, personal communication device 112, personal media device 114)), remote device (e.g., remote user device 120, server 122, podcast provider facility 118), any other device or facility or any combination thereof. The processing equipment will be discussed further in the context of modules, although the podcast parsing application may use any suitable combination of modules or configurations as processing equipment. Modules will be understood to represent particular configurations of processing equipment for performing of particular tasks.

User interface 202 may include any combination of user input device 104, display device 106, audio device 108, or other suitable user interface device. Communications module 212 may include I/O communication interfaces for any type of device or network including user device 102, user input device 104, display device 106, audio device 108, portable storage device 110, personal communication device 112, personal media device 114, network 116, server 122, wireless network 122, any other suitable device or network or any combination thereof.

Control module 210 may initiate, activate, deactivate, retrieve, manage, coordinate, couple, or otherwise control the various other modules and interfaces. Compiler module 204, extractor module 206, tag module 208, and control module 210 may also be included in the processing equipment to perform disclosed actions of the podcast parsing application. Compiler module 204 may generate compilation podcasts based on identified podcasts and compilation parameters, in accordance with some embodiments of the podcast parsing application. Extractor module 204 may identify and extract portions of one or more podcasts based on extraction parameters, in accordance with some embodiments of the podcast parsing application. Tag module 208 may create content tags for one or more portions of podcast content in accordance with some embodiments of the podcast parsing application. Tag module 208 may append, supplement, create, or otherwise edit metadata associated with podcast content.

Database 250 may include all information that is accessed by the podcast parsing application. Databases may include data files, application files, metadata files, any other data storage files or any combination thereof. The information included in database 250 may be stored in any suitable memory device (e.g., portable memory device 110), device that includes memory hardware (e.g., user device 102, remote user device 120, portable communication device 112, portable media device 114, podcast provider facility 118, server 122) or any other suitable device or any combination thereof. Information included in database 250 may not necessarily be stored in the same device or facility. Database 250 may include user parameters information 252, compilation parameters information 254, statistical parameters information 256, podcast content information 258, podcast metadata information 260, user generated information 262, any other suitable information of combination of information types. User parameters information 252 may include files including user viewing history, user preferences, user requests, user downloads, and other user profile information. Compilation parameters information 254 may include files including any subset or combination of compilation parameters. Statistical parameters information 256 may include files including popularity information such as most viewed podcasts, highest rated podcast, any other statistical sample information or any combination thereof. Podcast content information 258 may include files including podcast content, directories of podcasts, portions of podcasts, any other information related to podcast content or any combination thereof. Podcast metadata information 260 may include files including podcast metadata, content tags, user comments, any other suitable information related to podcast metadata or any combinations thereof. User generated information 262 may include files including user recommendations, user ratings, user generated metadata files, accumulated viewing history, accumulated ratings, accumulated recommendations, any other user generated information or any combination thereof.

Processing equipment 200 may communicate with or otherwise access any subset or all of database 250 via communication path 270. The podcast parsing application may employ communications module 212 to interface with the database 250. Communications path 270 may include optical networks, wired networks, wireless networks, any other suitable network or combinations thereof, and any suitable I/O interfaces or any combination thereof.

The podcast parsing application may use or access any subset or all of the modules included in processing equipment 200 (e.g., 202, 204, 206, 208, 210, 212 in FIG. 2) and information included in database 250 (e.g., 252, 254, 256, 258, 260, 262 in FIG. 2), any other suitable processing equipment or databases or any combination thereof.

Figure 3:
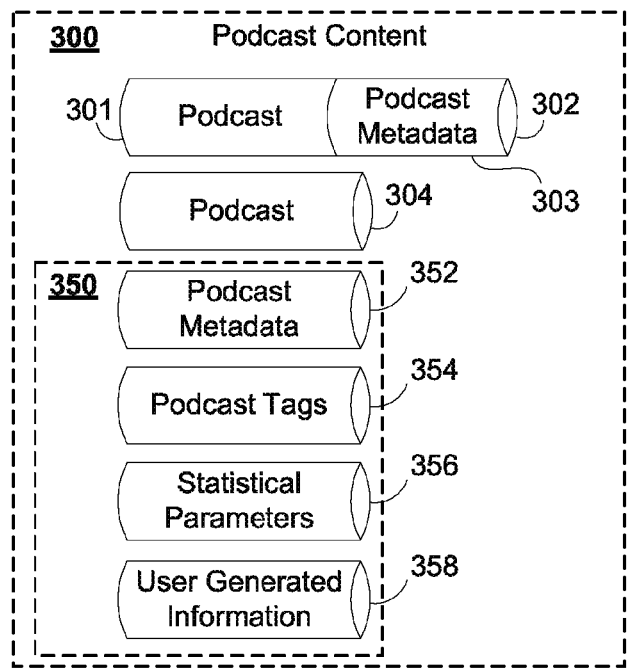
FIG. 3 is a block diagram of illustrative podcast content in accordance with some embodiments of the present disclosure.

Shown in FIG. 3 are data associated with podcast content 300. Podcast content 300 may be stored in any database 250 or combination of databases thereof. In some approaches, podcast 301 and associated metadata 302 may be stored in the same data file 303. In some approaches, podcast 304 may be stored separately from files including associated content information 350. Content information 350 may include metadata 352, tags 354, statistical parameters 356, or user generated information 358, or other associated information, or any combination of these information types. Podcasts and content information may be stored on the same memory device or different memory devices. In some embodiments, the podcast parsing application may access combined files 302 and sort podcast 301 from metadata 302. In some embodiments, the podcast parsing application may access podcast 304 and the podcast information 350 separately. In some embodiments, the podcast parsing application may access only content information 350, and not podcast 304.

Content metadata may include descriptive information regarding associated podcast content, content tags, portion tags, user generated information regarding podcast content, user viewing history data, multiple user cumulative viewing history, user ratings, user recommendation data, other data based on social metrics, or any combination thereof. Content or portion tags may include time information related to playback, content information related to podcasts or portions of podcasts, or other associated information regarding podcasts or portions of podcasts, any other suitable information or any combination thereof.

Figure 4:
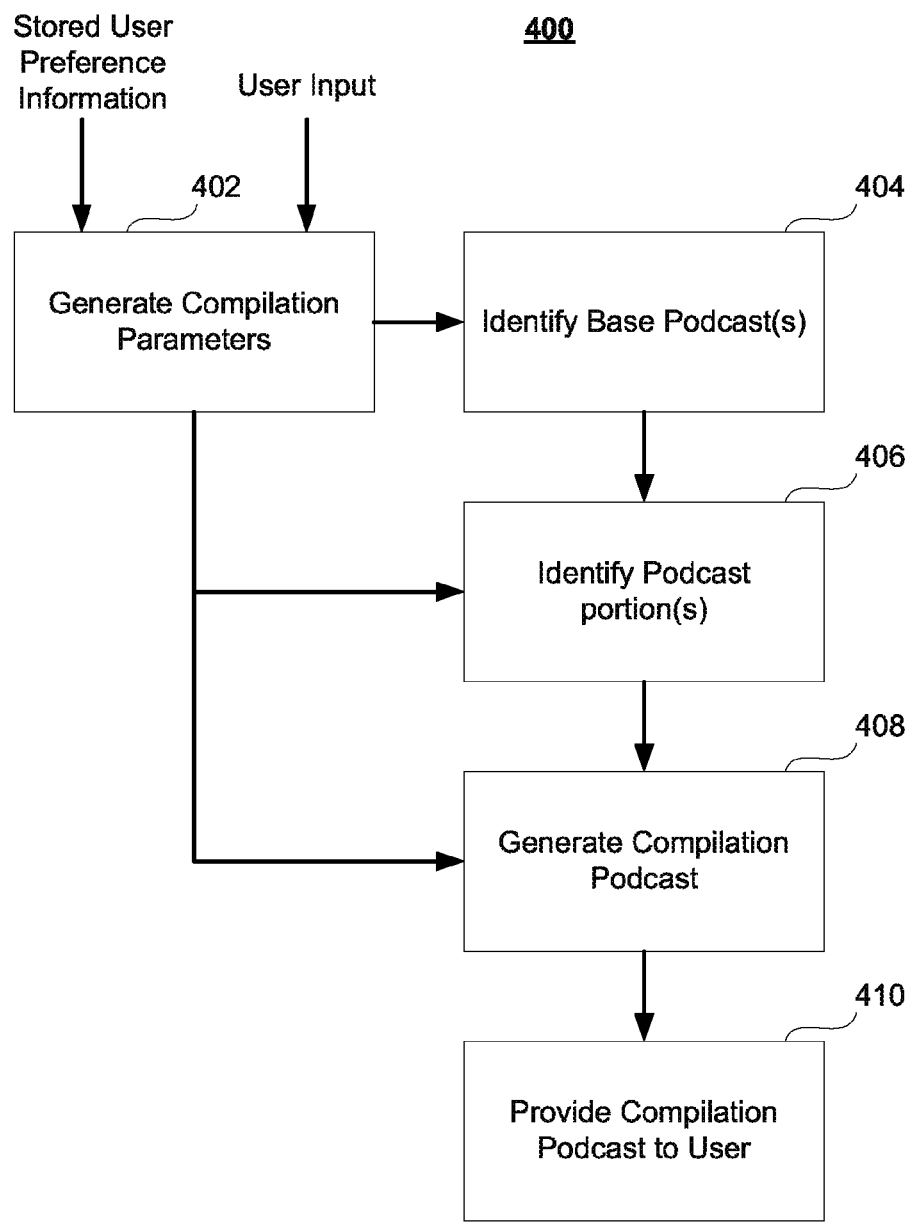
FIG. 4 is a flow diagram of illustrative steps for generating a compilation podcast in accordance with some embodiments of the present disclosure.

Shown in FIG. 4 is flow diagram 400 showing illustrative steps for generating a compilation podcast in accordance with one embodiment of the podcast parsing application. The podcast parsing application may generate compilation parameters at step 402 based on stored user preference information, user input, automated processes or any combination thereof. The compilation parameters collectively represent information that may be used by the podcast parsing application to identify base podcasts at step 404, identify portions of interest at step 406, generate the compilation podcast at 408, provide the podcast to a user at step 410, or perform other actions directed to generating compilation podcasts. Base podcasts will be understood to mean the subset (i.e., one or more) of podcasts identified by the podcast parsing application based on suitable parameters, user input, automated processes, any other suitable criteria or any combination thereof. The compilation parameters may include search information for identifying base podcasts. Hierarchy information may be included in the compilation parameters, and may be used by the podcast parsing application for ranking or sorting identified base podcasts or portions. The compilation parameters may also include indicators for saving or storing the generated podcast, the set of compilation parameters, any other information or any combination thereof. Compilation parameters may include content information such as title, podcast type, portion play length, compilation play length, popularity information, content statistics information, viewing statistics information, content viewing history information, content tags, content keywords, content provider information, content author, genre, content play list, person name, audio type, viewer recommendations, content creation date, and any other information related to podcast content. Compilation parameters may also include parameters derived from viewing history, popularity, or user recommendations.

At step 404, the podcast parsing application may use compilation parameters to identify base podcasts. The base podcasts may be as few as a single podcast. In some approaches, the podcast parsing application may allow a user to specify one or more podcasts as base podcasts. In some approaches, the podcast parsing application may identify one or more podcasts as based podcasts based on the compilation parameters and search results. In some approaches, the podcast parsing application may identify multiple base podcasts based on both user input and search results. For example the podcast parsing application may receive a user selection of two episodes of a particular podcast to be included as base podcasts. The podcast parsing application may use compilation parameters to search for additional podcasts relevant to the two episodes, and append the set of base podcasts. The podcast parsing application may receive input from the user directed to the set of base podcasts, including commands to add a podcast or portion to the set, delete a podcast from the set, sort the set according to sorting criteria, provide more information about one or more podcasts in the set, or purchase one or more podcasts in the set. Sorting criteria may be podcast title, genre, portion play length, hierarchy designation, creation date, download date, statistical parameters, popularity, user recommendations, any other suitable criteria or any combination thereof.

The podcast parsing application may identify podcast portions, as shown by step 406 in FIG. 4, based in part on the base podcasts, the compilation parameters, user input, automatic determinations, any other suitable criteria or combination of criteria thereof. Podcasts may include one or more portions. The podcast parsing application may identify portions of podcasts in the set of base podcasts that may be compiled into a compilation podcast. For example, the podcast parsing application may receive a user indication to identify one or more particular portions of podcasts, in the set of base podcasts, to be included in the compilation podcast. The podcast parsing application may append the user selected portions with portions determined by the compilation parameters. Portions may be identified based on compilation parameters such as portion play length, compilation play length, genre, sorting criteria, statistical parameters, popularity, user recommendations, or any other suitable compilation parameters or any combination thereof. For example, the podcast parsing application may identify the most popular portions having play lengths that cumulatively fit into a particular compilation play length. In a further example, the podcast parsing application may identify portions of a particular genre having fifteen to twenty minute play lengths. Any combination of suitable compilation parameters may be used to identify podcast portions for compilation. The podcast parsing application may exclude certain portions from the compilation podcast based on the compilation parameters, portion content, user input, any other criteria, or any combination thereof. For example, the podcast parsing application may receive an indication from the user to exclude portions featuring a certain voice or personality from the compilation. In a further example, the podcast parsing application may exclude portions having portion play lengths determined to be too long or short based on the compilation parameters.

The podcast parsing application may generate a compilation podcast, as shown by step 408 in FIG. 4, based in part on the identified portions, the compilation parameters, user input, automated processes, any other suitable criteria or any combination thereof. In some embodiments, the podcast parsing application may automate steps 402, 404, 406 and 408 to generate a compilation podcast based on compilation parameters, independent of user input. For example, the processing equipment hosting the podcast parsing application may periodically generate compilation podcasts based on predetermined compilation parameters and stream, or otherwise provide for download, the compilations to a user. In some embodiments, the podcast parsing application may perform steps 402, 404, 406 and 408 in response to receiving user input of compilation parameters, or some combination of automated processes and user input.

In some embodiments, the podcast parsing application may use compilation parameters to further edit the compilation podcast at compilation generation step 408. Transitions between adjacent portions within the compilation podcast may include blending, overlapping, a brief display of portion related information, any other transition technique or any combination thereof. In some approaches, the podcast parsing application may receive an indication from the user to rearrange or edit the portions included in the compilation podcast. Edits to the compilation podcast may include adding a portion, deleting a portion, substituting one portion for another, any other suitable editing action or any combination thereof.

The podcast parsing application may provide the compilation podcast to a user, as shown by step 410 in FIG. 4. The podcast parsing application may save or store the compilation podcast as a data file locally or remotely in any suitable memory device or combination of devices. The podcast parsing application may append the compilation podcast data file with metadata information, which may include the compilation parameters, thereby maintaining a single podcast file. The podcast parsing application may store the compilation podcast and associated metadata in separate files, and may link the metadata file with the compilation podcast data file. In some embodiments, the podcast parsing application stores the podcast data file and associated metadata file in separate memory devices or devices having memory hardware. In some embodiments, cloud storage techniques may be used by the podcast parsing application to store data files on multiple remote servers. Data files may be transmitted to or from a user device 102, portable memory device 110, personal communications device 112, personal media device 114, podcast provider facility 118, remote user device 120, server 122, any other suitable device or any combination thereof for storage or further transmittal. The podcast parsing application may provide the compilation podcast to a user by playing the compilation podcast on a suitable display device 106, audio device 108, any other suitable device or any combination thereof. The podcast parsing application may provide a selectable hyperlink, URL address, any other suitable indicator or combination thereof associated with the compilation podcast data file and metadata file to a user for streaming or otherwise downloading the compilation podcast.

In some embodiments, the podcast parsing application may identify portions of interest (i.e., step 406 in FIG. 4) directly, without prior identification of base podcasts (i.e., step 404 in FIG. 4). In some embodiments, portions of podcast content may be stored in a suitable database that may be searched by the podcast parsing application. Pointers or other indicators associated with portions may be used or accessed by the podcast parsing application to identify portions independent of identifying base podcasts. In some embodiments, metadata (e.g., content tags) associated with podcasts or portions may be accessed by the podcast parsing application to identify portions without first identifying base podcasts containing the portions.

Figure 5:
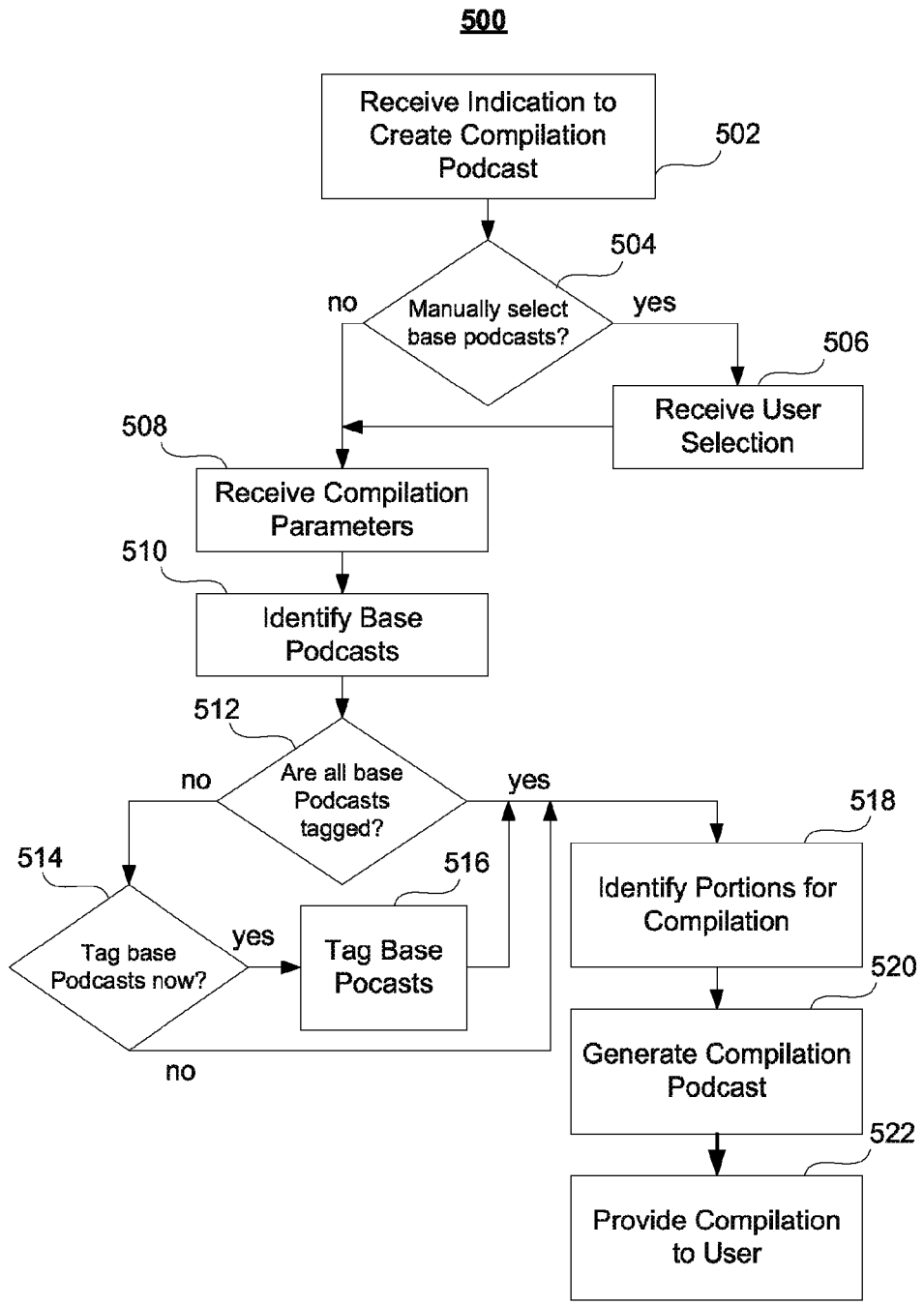
FIG. 5 is a flow diagram of illustrative steps for generating a compilation podcast in accordance with some embodiments of the present disclosure.

Shown in FIG. 5 is flow diagram 500 showing illustrative steps for generating a compilation podcast in accordance with some embodiments of the present disclosure. The podcast parsing application may receive an indication to create a compilation podcast at step 502. The indication may be automated, based on user input, or both and may be received by the podcast parsing application at set time intervals, in response to a user input, in response to an event, any other suitable time, or any combination thereof. In response to the indication to create a compilation podcast, the podcast parsing application may determine whether base podcasts will be determined automatically or be determined based on user input at determination step 504. Determination step 504 may be automated, based upon user input or both. If the podcast parsing application determines that one or more base podcasts will be determined based on user input, the podcast parsing application may prompt the user to enter or select the base podcasts of interest at step 506. The podcast parsing application receives compilation parameters at step 508, from automated processes, user input, any other suitable processes or any combination thereof. In some embodiments, the podcast parsing application may append a set of user selected base podcasts with further base podcasts based on compilation parameters received at step 508. Based on the compilation parameters, the podcast parsing application may identify a set of base podcasts in step 510. The podcast parsing application may identify the set of base podcasts based on search results, popularity information, viewing history, any other information or any combination thereof.

The set of base podcasts identified by the podcast parsing application in step 510 may or may not be tagged in any particular manner. The podcast parsing application may access the metadata associated with the base podcasts to determine whether portion tags have been specified at determination step 512. If the base podcasts have not been tagged, or have not been tagged in a desired fashion, the podcast parsing application may determine whether to add or append tagging metadata at determination step 514. The podcast parsing application may automatically determine that base podcasts require tagging, or may receive user input to tag one or more base podcasts. If the podcast parsing application determines that base podcasts are to be tagged, the podcast parsing application may tag the base podcasts as shown at step 516. The tagging process may be automated, based on user input or both. The podcast parsing application may identifies portions to be included in the compilation podcast at step 518. The podcast parsing application may identify portions based on the compilation parameters, search results, including tagging information, popularity information, viewing history, user input, any other suitable criteria or any combination thereof. The podcast parsing application may generate a compilation podcast based on the identified portions and the compilation parameters at step 520. Any subset of identified portions may be included in the compilation podcast. The podcast parsing application may generate the compilation podcast from a subset of identified portions based on compilation parameters including tagging information, popularity information, viewing history, automatic determinations, user input, any other suitable criteria or any combination thereof.

The podcast parsing application may provide the compilation podcast to one or more users at step 522. In some embodiments, the podcast parsing application may initiate playback when generation of the compilation podcast is complete. In some embodiments, the podcast parsing application may display a link, icon URL address, or other suitable availability indicator associated with the compilation podcast, or otherwise provide options for one or more users to consume the compilation podcast. In some approaches, the podcast parsing application may initiate playback of the compilation podcast in response to a user selection of an availability indicator. In some embodiments the podcast parsing application may upload the compilation podcast and associated metadata to one or more remote devices or facilities (e.g., podcast provider facility 118, remote user device 120, server 122) via any suitable network or combination of networks. In some embodiments the application may store the compilation podcast and associated metadata on one or more memory devices or devices including memory hardware (e.g., user device 102, portable memory device 110, personal communication device 112, personal media device 114). In some embodiments, the podcast parsing application may not store metadata or content tags associated with the compilation podcast.

Figure 6:
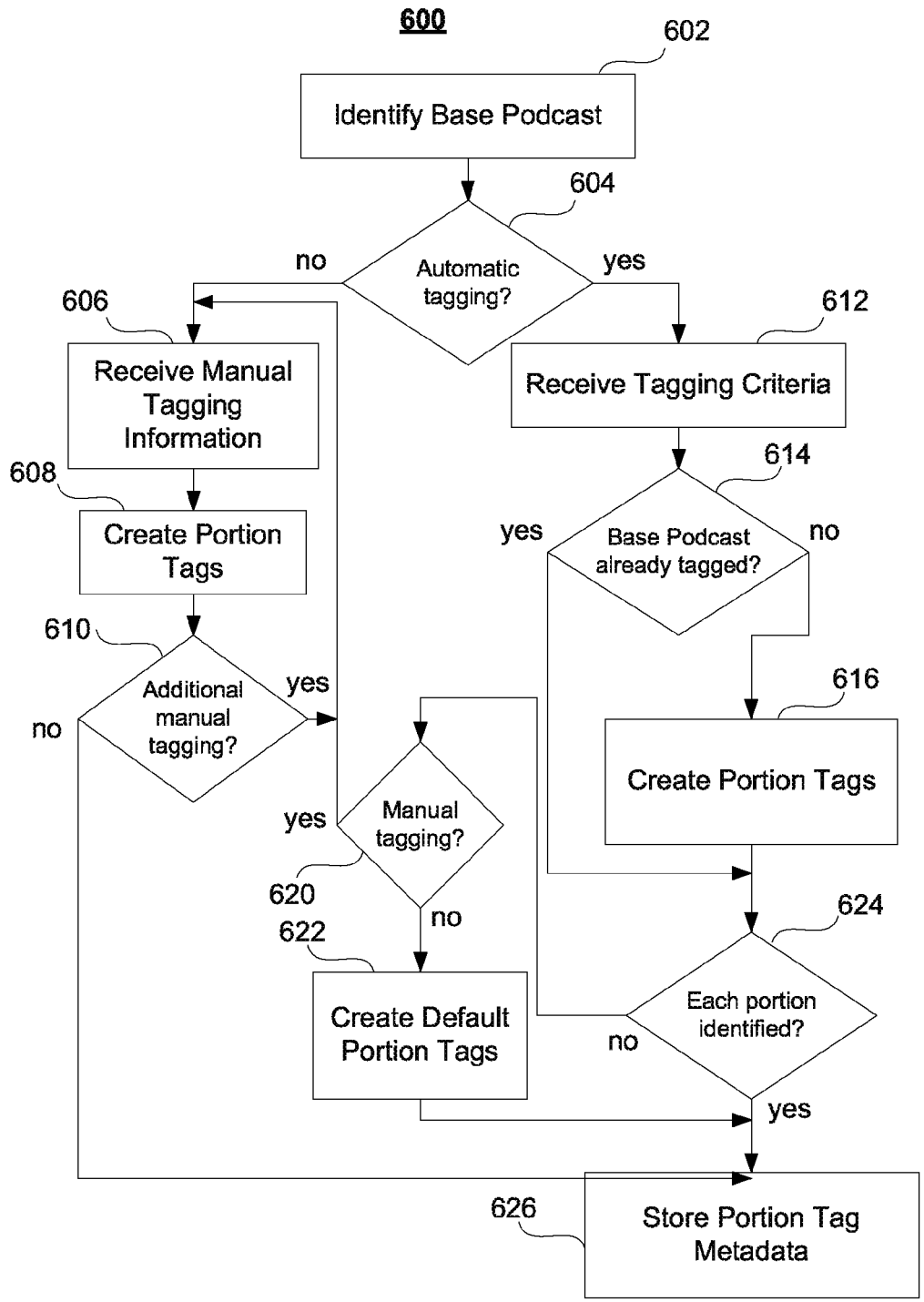
FIG. 6 is a flow diagram of illustrative steps for tagging podcast content in accordance with some embodiments of the present disclosure.

Shown in FIG. 6 is flow diagram 600 showing illustrative steps for tagging a portion of a podcast in accordance with one embodiment of the present disclosure. Flow diagram 600 may correspond to step 516 in FIG. 5 in some embodiments. The podcast parsing application may identify a base podcast at step 602, based on compilation parameters, automated processes, user input, any other suitable criteria or any combination thereof. The podcast parsing application may determine whether automatic tagging will be used at determination step 604, based on compilation parameters, automated processes, user input or any combination thereof. If the podcast parsing application determines that automatic tagging will not be employed, the podcast parsing application may receive tagging information based on user input (e.g., prompt the user to input manual tagging information) at step 606. The podcast parsing application may provide options to a user to denote portions including drag and drop markers, text fields for receiving user input of playback times or time intervals, selection of a portion break using a cursor or movable pointing indicator, any other suitable option or any combination thereof to denote portions within a podcast. The podcast parsing application may provide options to a user to manually tag portions including text fields for receiving user input or editing of metadata information, pull-down menus, browse functionality, any other suitable options or combination thereof. Following receiving manual tagging information at step 606, the podcast parsing application may create portion tags at step 608. The podcast parsing application may receive user input to create, add, append, or otherwise edit metadata associated with the base podcast with the created portion tags. For example, the podcast parsing application may allow a user may tag a particular portion of a podcast as a "favorite" by adding suitable comments or indicators in the associated metadata. The podcast parsing application may allow the user to tag particular portions with keywords, comments, any other suitable designations or any combination thereof. The podcast parsing application may allow additional user tagging by determination step 610. For example, a user may want to tag portions of a podcast in accordance with the user's interest in various portions. Additionally the user may want to tag portions in accordance with the featured personality in each portion. The podcast parsing application may allow the user to specify hierarchy information amongst the various types of content tags. The podcast parsing application may store the content tags as shown in step 626 in FIG. 6. The podcast parsing application may access, accept or otherwise recognize a set of predefined content tags. The parsing application may provide options to a user to select among the predefined content tags. Predefined content tags may be defined or provided by a podcast provider, broadcaster, media application, user, group of users, social networking site, or other suitable entity or any combination thereof. Predefined content tags may allow the podcast parsing application to perform standardize actions directed to content tags including collection, arrangement, search, retrieval, storage, display, any other suitable action or any combination thereof.

If the podcast parsing application proceeds with automatic tagging at determination step 604, the podcast parsing application may receive tagging criteria at step 612. Tagging criteria may include indications to tag portions based on audio processing techniques, preexisting content tags, viewing history, popularity information, statistical determination, any other suitable criteria or any combination thereof. Content tags or content metadata may include user recommendations, number of views, user ratings, any other social metric or any combination thereof. Prior to creating portion tags, the podcast parsing application may determine whether the base podcast is already tagged in a particular manner at determination step 614. The podcast parsing application may determine that the base podcast has not been previously tagged according to the tagging criteria at determination step 614.

The podcast parsing application may create automatic portion tags based on the tagging criteria at step 616. In some embodiments, the podcast parsing application may employ audio processing techniques at step 616. Audio processing techniques may include voice identification, voice recognition, speech recognition, any other suitable technique to elucidate information from audio content, or any combination thereof. The podcast parsing application may employ voice or speech recognition to determine who is speaking or what is being said, respectively, during a particular podcast. The podcast parsing application may use audio processing techniques in substantially real-time (i.e. substantially simultaneous with creation, storage, request or playback of podcast content) to tag portions of podcast content. The podcast parsing application may access an audio library database or other reference audio files to assist in determining a speaker or speech. The podcast parsing application may also use voice identification techniques to determine the personality or voice featured during a podcast. The podcast parsing application may use techniques including Gaussian Mixture Models, frequency estimation, pattern recognition models, Hidden Markov Models, any other suitable models or combinations thereof to determine breaks between different speakers, breaks between speaking and music, any other audio distinctions or any combination thereof. In some embodiments, the podcast parsing application may use a Gaussian Mixture Model, which is based on a weighted sum of normal distributions, to determine a likely speaker during a podcast. The podcast parsing application may tag portions of the a podcast in accordance with the results of audio processing techniques. For example, the podcast parsing application may create associated content tags for portions of an interview podcast that demarcate the podcast at breaks between segments featuring the interviewer or interviewee. This may allow, for example, a user to skip, extract, exclude or otherwise parse a podcast featuring an interview such that only the portions featuring the interviewee are played during playback.

The podcast parsing application may create content tags at step 616 based on cumulative viewing history (e.g., most viewed by users), single user viewer history (e.g., most viewed by user), popularity, ratings (e.g., highest rated), recommendations (e.g., most recommended), any other suitable social metric or any combination thereof. For example, the podcast parsing application may tag the most popular portions of a podcast, thereby distinguishing this portion and allowing a user to consume only this portion.

Figure 7A:
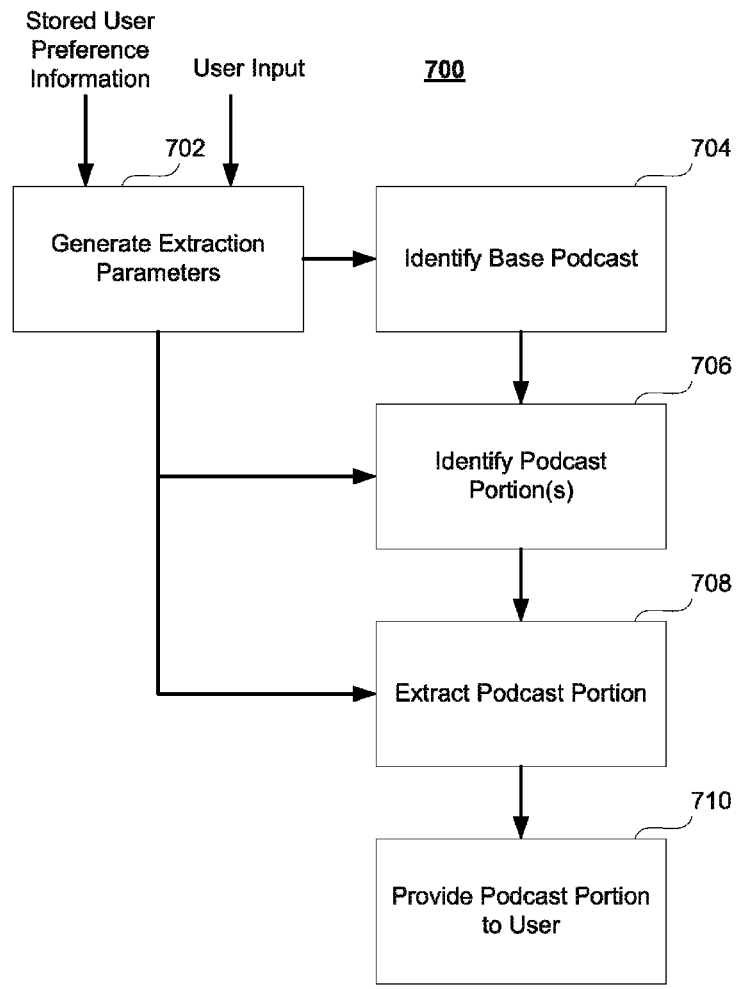
FIG. 7A is a flow diagram of illustrative steps for extracting portions of a podcast in accordance with some embodiments of the present disclosure.

Shown in FIG. 7A is flow diagram 700 showing illustrative steps for extracting a portion of podcast content in accordance with one embodiment of the present disclosure. The podcast parsing application may generate extraction parameters at step 702 based on stored user preference information, user input, automated processes or any combination thereof. The extraction parameters collectively represent information used by the podcast parsing application to identify a base podcast at step 704, identify portions of interest within the base podcast at step 706, extract the portions of interest at 708, and provide the extracted portions to a user at step 710. The extraction parameters may include search information for identifying base podcasts. Hierarchy information may be included in the extraction parameters, and may be used by the podcast parsing application for selecting identified base podcasts. The extraction parameters may include options for saving or storing extracted portions, extraction parameters, any other suitable information or any combination thereof. Extraction parameters may include content information such as podcast title, podcast type, podcast play length, portion play length, popularity information, content statistics information, viewing statistics information, portion viewing history information, portion tags, portion keywords, content provider information, content author, genre, content play list, featured personality name, audio type, content creation date, any other suitable information related to podcast content or any combination thereof. Extraction parameters may include parameters derived from viewing history, popularity, user recommendations, any other suitable social metrics or any combination thereof.

At step 704, the podcast parsing application may use extraction parameters to identify the base podcasts. The base podcasts may be as few as a single podcast. In some approaches, the podcast parsing application may allow a user to specify one or more podcasts as base podcasts. In some approaches, the podcast parsing application may identify one or more base podcasts based on the extraction parameters, search results, user input, any other suitable criteria or any combination thereof. For example, the podcast parsing application may allow a user to select an episode of a particular podcast to be included as a base podcast. The podcast parsing application may search for additional podcasts, via extraction parameters, to append the set of base podcasts. The podcast parsing application may receive input from a user directed to a base podcast, including commands to provide more information about one or more podcasts in the set, or purchase one or more podcasts.

The podcast parsing application may identify podcast portions, as shown by step 706 in FIG. 7A, based in part on the base podcast, extraction parameters, user input, automated processes, any other suitable criteria or any combination thereof. For example, the podcast parsing application may allow a user to identify one or more particular portions of a podcast to be extracted. The podcast parsing application may append the user selected portions with portions determined by extraction parameters. Portions may be identified based on extraction parameters such as portion play length, genre, sorting criteria, statistical parameters, popularity, user recommendations, any other suitable extraction parameter or any combination thereof. For example, the podcast parsing application may identify the most popular or most viewed portions of a particular podcast. Any combination of suitable extraction parameters may be used to identify podcast portions for extraction. The podcast parsing application may exclude certain portions from extraction based on the extraction parameters. For example, the podcast parsing application may receive an indication from the user to exclude portions featuring a certain voice or personality from being extracted. In a further example, the podcast parsing application may exclude from identification portions having portion play lengths determined to be outside of a specified play length interval based on the extraction parameters.

The podcast parsing application may extract portions of podcast content, as shown by step 708 in FIG. 7A, based in part on the identified portions, extraction parameters, user input, automated processes, any other suitable criteria or any combination thereof. In some embodiments, the podcast parsing application may automate (e.g., perform independent of user input) steps 702, 704, 706 and 708 to extract podcast content based on extraction parameters. For example, the processing equipment hosting the podcast parsing application may periodically extract podcast content from a set of podcasts based on predetermined extraction parameters and stream, or otherwise provide for download, the extracted portions as shown by step 710. In some embodiments, the podcast parsing application may perform steps 702, 704, 706, 708 and 710 in response to user input of extraction parameters, or based on some combination of automated processes and user input.

The podcast parsing application may provide the extracted portions to a user, as shown by step 710 in FIG. 7A. The podcast parsing application may save or store the extracted portions as one or more data files, either locally or remotely in one or more memory devices or devices having memory hardware. The podcast parsing application may append each of the extracted portion data files with metadata information, which may include the extraction parameters. In some embodiments, both the extracted portion data files, metadata files, other suitable information or any combinations thereof may be stored on user device 102, portable memory device 110, personal communications device 112, personal media device 114, any other suitable device or any combination thereof. The podcast parsing application may store the extraction portions and associated metadata in separate files, and may link the metadata files with the extracted portion data files. In some embodiments, the portion data files and associated metadata files may be stored in separate memory devices. In some embodiments the podcast parsing application may upload the extracted portion and associated metadata to one or more remote devices or facilities (e.g., podcast provider facility 118, remote user device 120, server 122) via any suitable network or combination of networks. In some embodiments, the podcast parsing application may use cloud storage techniques to store data files on multiple remote devices. The podcast parsing application may provide the extracted portion to a user by playing the portion on a suitable display device 106, audio device 108, any other suitable device or any combination thereof. The podcast parsing application may provide a selectable hyperlink, URL address, or other indicator associated with the extracted portion data file and metadata file to a user for streaming or otherwise downloading the extracted portion.

In some embodiments, the podcast parsing application may employ extraction parameters to skip or exclude certain portions of a podcast during playback. For example, the podcast parsing application may receive user input specifying portions that are of interest or are not of interest to the user. The podcast parsing application may tag these portions accordingly, and play only the portions of interest during playback. Transition techniques may be used by the podcast parsing application to smooth or otherwise control the playback near the portion seams (e.g., playback period near the beginning or end of any particular portion).

Figure 7B:
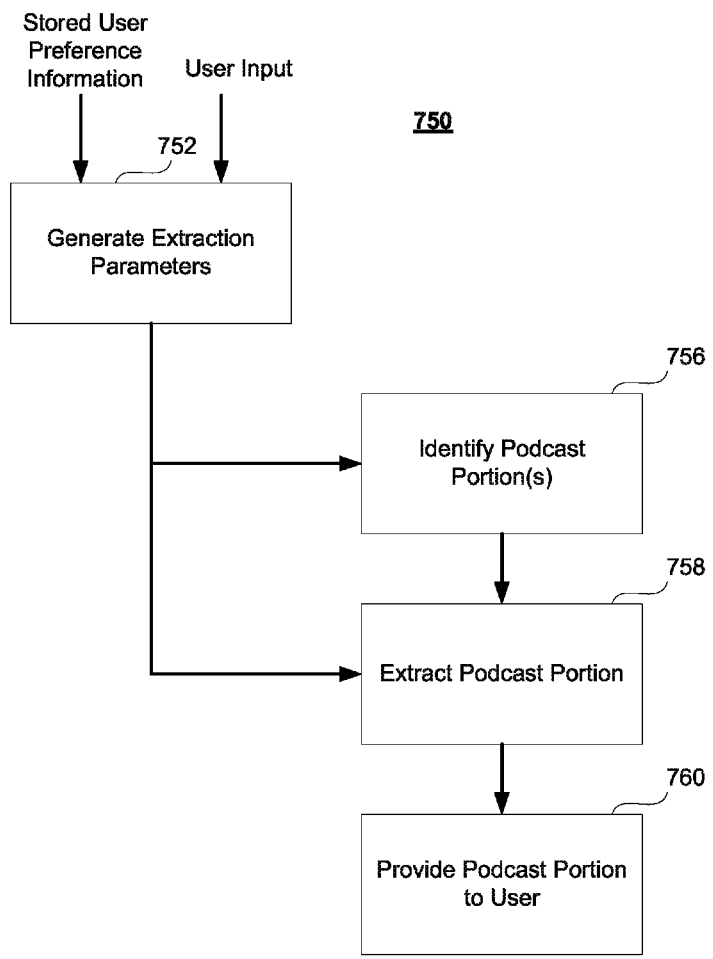
FIG. 7B is a flow diagram of illustrative steps for extracting portions of a podcast in accordance with some embodiments of the present disclosure.

Shown in FIG. 7B is flow diagram 750 showing illustrative steps for extracting a portion of podcast content in accordance with one embodiment of the present disclosure. The podcast parsing application may generate extraction parameters at step 752 based on stored user preference information, user input, automated processes or any combination thereof. The extraction parameters collectively represent information used by the podcast parsing application to identify portions of interest at step 756, extract the portions of interest at 758, and provide the extracted portions to a user at step 760. The extraction parameters may include search information for identifying portions of podcast content. Hierarchy information may be included in the extraction parameters, and may be used by the podcast parsing application for selecting identified portions of podcast content. The extraction parameters may include options for saving or storing extracted portions, extraction parameters, any other suitable information or any combination thereof. Extraction parameters may include content information such as podcast title, podcast type, podcast play length, portion play length, popularity information, content statistics information, viewing statistics information, portion viewing history information, portion tags, portion keywords, content provider information, content author, genre, content play list, featured personality name, audio type, content creation date, any other suitable information related to podcast content or any combination thereof. Extraction parameters may include parameters derived from viewing history, popularity, user recommendations, any other suitable social metrics or any combination thereof.

The podcast parsing application may identify podcast portions, as shown by step 756 in FIG. 7B, based in part on extraction parameters, user input, automated processes, any other suitable criteria or any combination thereof. In some embodiments, the podcast parsing application may not identify a base podcast. For example, the podcast parsing application may allow a user to identify one or more particular portions of a podcast to be extracted. The podcast parsing application may append the user selected portions with portions determined by extraction parameters. Portions may be identified based on extraction parameters such as portion play length, genre, sorting criteria, statistical parameters, popularity, user recommendations, any other suitable extraction parameter or any combination thereof. For example, the podcast parsing application may identify the most popular or most viewed portions of a particular podcast. Any combination of suitable extraction parameters may be used to identify podcast portions for extraction. The podcast parsing application may exclude certain portions from extraction based on the extraction parameters. For example, the podcast parsing application may receive an indication from the user to exclude portions featuring a certain voice or personality from being extracted. In a further example, the podcast parsing application may exclude from identification portions having portion play lengths determined to be outside of a specified play length interval based on the extraction parameters.

The podcast parsing application may extract portions of podcast content, as shown by step 758 in FIG. 7B, based in part on the identified portions, extraction parameters, user input, automated processes, any other suitable criteria or any combination thereof. In some embodiments, the podcast parsing application may automate (e.g., perform independent of user input) steps 752, 756 and 758 to extract podcast content based on extraction parameters. For example, the processing equipment hosting the podcast parsing application may periodically extract podcast content from a set of podcasts based on predetermined extraction parameters and stream, or otherwise provide for download, the extracted portions as shown by step 760. In some embodiments, the podcast parsing application may perform steps 752, 756, 758 and 760 in response to user input of extraction parameters, or based on some combination of automated processes and user input.

The podcast parsing application may provide the extracted portions to a user, as shown by step 760 in FIG. 7B. The podcast parsing application may save or store the extracted portions as one or more data files, either locally or remotely in one or more memory devices or devices having memory hardware. The podcast parsing application may append each of the extracted portion data files with metadata information, which may include the extraction parameters. In some embodiments, both the extracted portion data files, metadata files, other suitable information or any combinations thereof may be stored on user device 102, portable memory device 110, personal communications device 112, personal media device 114, any other suitable device or any combination thereof. The podcast parsing application may store the extraction portions and associated metadata in separate files, and may link the metadata files with the extracted portion data files. In some embodiments, the portion data files and associated metadata files may be stored in separate memory devices. In some embodiments the podcast parsing application may upload the extracted portion and associated metadata to one or more remote devices or facilities (e.g., podcast provider facility 118, remote user device 120, server 122) via any suitable network or combination of networks. In some embodiments, the podcast parsing application may use cloud storage techniques to store data files on multiple remote devices. The podcast parsing application may provide the extracted portion to a user by playing the portion on a suitable display device 106, audio device 108, any other suitable device or any combination thereof. The podcast parsing application may provide a selectable hyperlink, URL address, or other indicator associated with the extracted portion data file and metadata file to a user for streaming or otherwise downloading the extracted portion.

In some embodiments, the podcast parsing application may employ extraction parameters to skip or exclude certain portions of a podcast during playback. For example, the podcast parsing application may receive user input specifying portions that are of interest or are not of interest to the user. The podcast parsing application may tag these portions accordingly, and play only the portions of interest during playback. Transition techniques may be used by the podcast parsing application to smooth or otherwise control the playback near the portion seams (e.g., playback period near the beginning or end of any particular portion).

Illustrative embodiments of the podcast parsing application in accordance with the present disclosure will be discussed further in the context of FIGS. 8-11. FIGS. 8-11 show exemplary screens illustrative of the podcast parsing application. In some embodiments, all functions and options related to consuming podcasts known in the art may be available at any step of the podcast parsing application. For example, the exemplary screens shown in FIGS. 8-11, may include commands for playing, rewinding, fast forwarding, pausing, stopping, any other suitable functionality directed to a podcast or portion of podcast content, or any combination thereof. Although illustrative FIGS. 8-11 show fields accepting user input, it will be understood that the podcast parsing application may perform any or all disclosed actions independent of user input or a user input interface.

Figure 8:
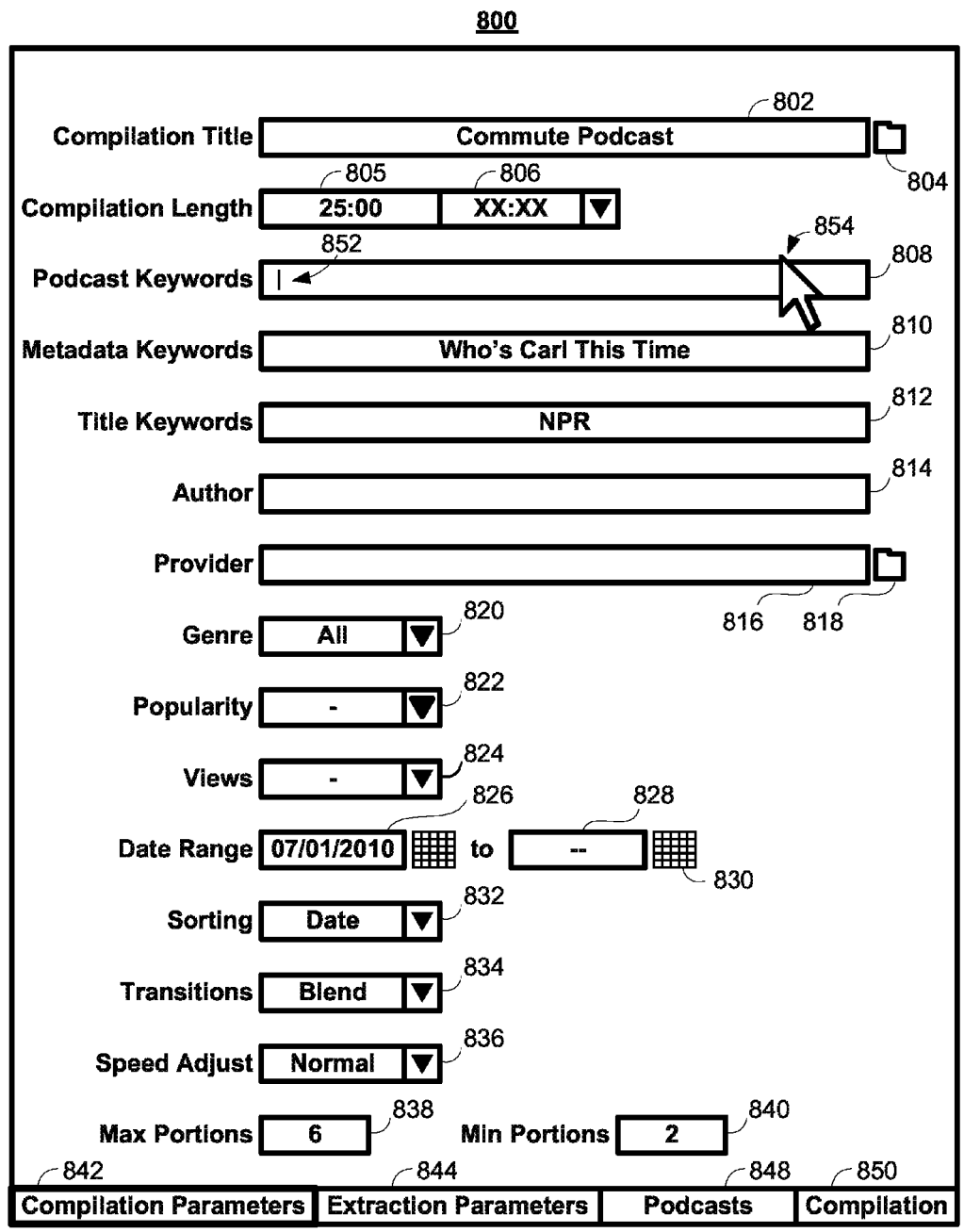
FIG. 8 shows an illustrative compilation parameter display interface in accordance with some embodiments of the present disclosure.

Shown in FIG. 8 is exemplary screen 800, displaying one example of a set of compilation parameters in accordance with some embodiments of the podcast parsing application. In some embodiments, various fields may be displayed by the podcast parsing application, allowing user input (e.g., text fields or selectable menus). Any suitable combination of user input may be received by the podcast parsing application to indicate compilation parameters. Compilation parameters that may be specified by the user include those shown in FIG. 8, those discussed in the context of FIGS. 4-5, any other suitable parameters or any combination thereof.

The podcast parsing application may allow a compilation podcast title to be entered by a user, as shown by field 802. On exemplary screen 800, the string "Commute Podcast" has been entered in field 802 as the compilation podcast data file name. Additional options for commands including saving, storing, retrieving, recalling, any other suitable action directed to a compilation podcast, or combinations thereof, may be provided by the podcast parsing application (e.g., selectable icon 804). The podcast parsing application may allow compilation play length to be specified as shown by field 805, in various format (e.g., format menu field 806). Field 806 is shown with a pull-down menu option, but may be any type of selectable option. The podcast parsing application may allow search keywords to be entered by the user as shown by fields 808, 810 and 812. The podcast parsing application may use search keywords to search among podcast description, podcast metadata, and podcast titles, any other suitable podcast information or any combination thereof. Additional search parameters may include author 814, provider 816, genre 820, popularity 822, views 824, date range 826 and 828, any other suitable search parameter or any combination thereof. The podcast parsing application may allow search parameters to be specified by text input from the user, by pull-down menu, browsing, any other suitable selection technique or any combination thereof. Icon 818 is an exemplary selectable item that display a pop-up window or other additional information or lists regarding "Provider" field 816. The podcast parsing application may use icons such as 804 and 818 to accompany any parameter field. Calendar icons 830, or any other suitable options for selecting dates or times, may accompany any date or time field. The podcast parsing application may display a pop-up calendar or other display in response to selection of calendar icon 830, allowing user selection of a date to populate the "Date Range" fields 826 and 828. In some embodiments, the podcast parsing application may present a clock from the user may select a time or time interval.

The podcast parsing application may display further parameters, as shown by screen 800, directed to sorting 832, transitions 834, speed adjust, maximum 838 and minimum 840 number of portions to be compiled, any other suitable parameters or any combination thereof. The podcast parsing application may use sorting parameters to determine the manner in which base podcasts may be arranged. Sorting parameters may include any suitable compilation parameter or combination of parameters, and may proceed chronologically or alphabetically. Transition options may be provided by the podcast parsing application to smooth, demarcate, or otherwise control the display during portion seams. The speed adjust option may allow the speed of one or more portion to be adjusted during playback. The "Min Portions" 838 and "Max Portions" 840 fields, or any suitable field or combination of fields, may be provided by the podcast parsing application to bound the number of portions to be included in the compilation based on user input. Any combination of compilation parameters may accompany or replace the displayed fields in accordance with some embodiments of the podcast parsing application. The podcast parsing application may display a text indicator (e.g., cursor 852) that may be used to enter text into suitable fields. The podcast parsing application may display a movable pointing indicator (e.g., arrow 854) that may be used to move a cursor, select options, activate menus, any other suitable function or any combination thereof.

In the particular example shown by screen 800, the podcast parsing application has received user indication to generate a compilation that has a play length of 25 minutes as shown in field 805, including 2 to 6 portions as selected in fields 838 and 840. In addition, the podcast parsing application has received user indication to search for podcasts with the text string "NPR" included in the title (as shown in field 812), and the text string "Who's Carl This Time" included in the associated metadata (as shown in field 810). The podcast parsing application has also received user indication to search for podcasts that are dated from "Jul. 1, 2010" to the present, as shown by fields 826 and 828. Blank "Date Range" field 828 in this example corresponds to the present date. In some examples, the "Date Range" field 826 may be blank, corresponding to no earlier date limit for base podcasts that can be identified. The base podcasts identified by the podcast parsing application may be sorted by date as shown by the user selection of "Date" from field 832. The podcast parsing application has received user indication to use the "Blend" option for the transition during portion seams.

The lower portion of screen 800 displays five panels entitled "Compilation Parameters" 842, Extraction Parameters" 844, "Podcasts" 848, and "Compilation" 850. These panels may correspond to the associated screen, and may be in accordance with some embodiments of the present disclosure. Panel 842 entitled "Compilation Parameters" may be selected in screen 800, as conveyed by the thick border of panel 842. Accordingly, other screens may be displayed by the podcast parsing application. The podcast parsing application may employ multiple screens, pop-up windows, a single screen, a reduced area of a single screen, any other graphical interface, any other interface or any combination thereof while performing any disclosed function or any combination of functions. In some embodiments, the podcast parsing application may be accessed from, for example, other host applications (e.g., iTunes®). In some embodiments, the podcast parsing application interface may be more directly fashioned to match the design of a host application.

As shown illustratively in FIG. 4, in some embodiments the podcast parsing application may identify base podcasts based on the generated compilation parameters. In reference to FIGS. 8-11, panel 848 associated with the "Podcasts" screen may be selected, directing the podcast parsing application to display screen 900 as shown in FIG. 9. Illustrative screen 900 displays a subset of the compilation parameters 910, a list of base podcasts 920, information related to a single podcast 950 and information related to a single portion 980. The podcast parsing application may display all compilation parameters, some compilation parameters, or no compilation parameters after compilation parameters are generated. In display region 910, some relevant information may be displayed, for example, based on user input from screen 800.

Display region 920 may include a listing of identified base podcasts, arranged in a vertical list, sorted by date. The podcast parsing application may include column headings such as, for example, "Podcast" 922, "Author" 924, "Length" 926, and "Tagging" 928. Additional information regarding the base podcasts may be displayed by the podcast parsing application in response to receiving user selection of column headings icons 930, located horizontally on either side of the column headings. Any suitable podcast information or combination of information may displayed by the podcast parsing application. The podcast parsing application may display information in any fashion, style, design, arrangement, or format. In displayed example screen 900, the podcast parsing application has identified, for example, four base podcasts. Scroll bar 934 may be displayed by the podcast parsing application for displaying additional base podcasts. Any suitable control may be used by the podcast parsing application to display all or a subset of the base podcasts. The command bar located at the bottom of region 920 may include commands to, for example, add a base podcast 936, delete a base podcast 938, generate a compilation of all or a subset of the base podcasts 940, tag podcasts 942, request additional information related to the base podcasts or podcast parsing application, or request help 946 on one or more features of the podcast parsing application. The podcast parsing application may allow command bar tiles to be selected by the user to allow further actions. In displayed example screen 900, the podcast parsing application has received a user selection of the top podcast 932, dated Jul. 31, 2010, and the "info" command 944. The podcast parsing application may, for example, display information regarding podcast 932 in response to selection of podcast 932 and command button 944, as shown by display region 950. It will be understood that the podcast parsing application may display or use any commands or any combination of commands while performance of disclosed tasks.

Display region 950 illustratively displays information associated with the selected podcast in display region 920. The selected podcast "NPR: Wait Wait . . . Don't Tell Me (Jul. 31, 2010)" 932 has been tagged as having nine portions in this example. Each portion may include a portion marker, as shown by portion marker 956 for the fourth portion. The portion marker may be selectable by the user to provide additional information regarding the portion or to perform actions directed to the portion. Each portion seam may include a seam marker, as shown by seam marker 954. The podcast parsing application may display the playback time associated with seam marker or may provide additional information related to the portion seam. The seam marker may be selectable and the podcast parsing application may provide options regarding the portion seam. In some embodiments the podcast parsing application may allow the user to place seam markers to manually demarcate a portion. It will be understood that any suitable interface may be used by the podcast parsing application to distinguish and display portions of podcast content and associated information.

The command bar located in the lower part of region 950 may include commands to, for example, add a marker 960, delete a marker 962, extract a portion 964, tag a portion 966, request additional information related to the portions or podcast parsing application 968, and request help 970 on one or more features of the podcast parsing application. In some embodiments, the podcast parsing application may receive user indication to add, delete, or otherwise adjust portion markers or seam markers. The podcast parsing application may also receive user indication to tag portions of a podcast by appending the metadata file associated with the portion or podcast. The podcast parsing application may allow command bar tiles to be selected by the user to perform further actions on the portions of the selected podcast. In displayed example screen 900, the podcast parsing application has received user indication selecting the second portion 932, denoted by portion marker "2", and the "info" command 970. The podcast parsing application may display information regarding selected portion "2" in response to selection of portion 932 and command button 970, as shown by display region 980. It will be understood that the podcast parsing application may display information regarding portions of podcast content in any suitable format or arrangement. It will be understood that the podcast parsing application may display information regarding portions of podcast content while performing any suitable action.

The podcast parsing application may display information associated with a selected portion of a selected podcast, as shown by display region 980. The selected portion, tagged as the NPR segment "Who's Carl This Time" is displayed during playback time 00:31 to 7:00, or 31 seconds to 7 minutes. The tagging for this program is illustratively shown as "Segment Title", indicating that the portions of this podcast have been tagged in metadata by program segment title. The segment "Who's Carl This Time" represents one of the tagged segments. Corresponding to the search keywords entered in field 810 and 812, the podcast parsing application may identify podcasts including the appropriate text strings, such as the portion designated 958.

Figure 10:
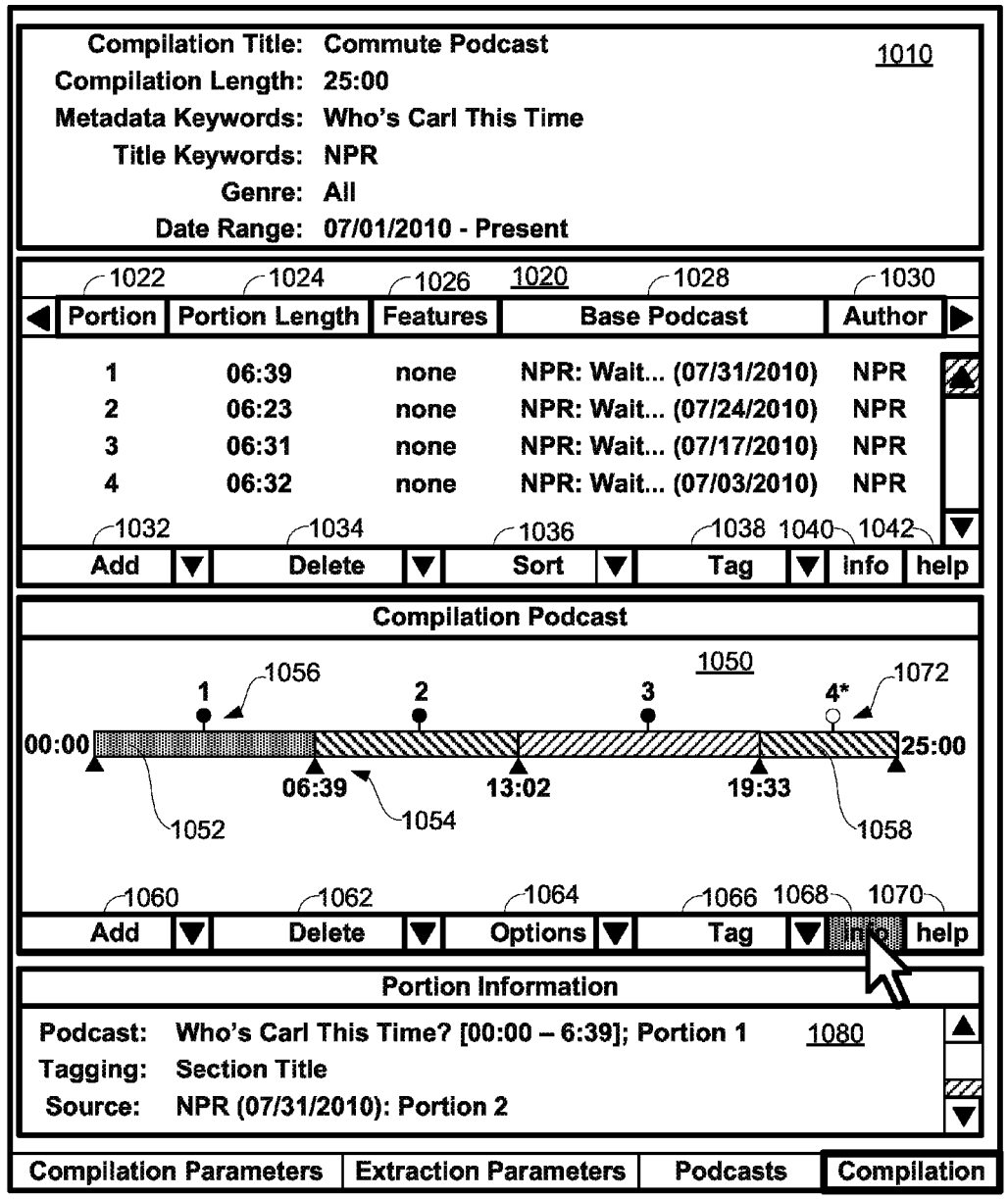
FIG. 10 shows an illustrative compilation podcast display interface in accordance with some embodiments of the present disclosure.

The "Compilation" screen 1000 shown in FIG. 10 is an illustrative display in accordance with one embodiment of the present disclosure. In some embodiments, illustrative screen 1000 may correspond to compilation podcast generation step 408 in FIG. 4. The podcast parsing application may display some subset of compilation parameters 1010, a listing of the identified podcast portions, a representation of the compilation 1050, information related to a single portion 1080, any other suitable information or any combination thereof. In display region 1010, some relevant information is displayed by the podcast parsing application based on user input from screen 800. It will be understood that the podcast parsing application may display any suitable information while performing any disclosed action.

The podcast parsing application may display a listing of identified portions, arranged in a vertical list, sorted by date, as shown by display region 1020. The podcast parsing application may display column headings "Podcast" 1022, "Portion Length" 1024, "Features" 1026, "Base Podcast" 1028, "Author" 1030, any other suitable heading or any combination thereof. The podcast parsing application may display any suitable information or combination of information regarding the identified portions. In illustrative display region 1020, for example, the podcast parsing application has identified four portions based on compilation parameters.

The podcast parsing application may display command bar options such as, for example, the command buttons located at the bottom of region 1020. The podcast parsing application may display commands to add a portion 1032, delete a portion 1034, sort the portions 1036, tag the portions 1038, request additional information related to the portions or podcast parsing application 1040, and request help 1042 on one or more features of the podcast parsing application. In some embodiments, the podcast parsing application may receive user indication to add portions to the set of identified portions 1032, delete portions from the set of identified portions 1034, sort the identified portions based on one or more information fields 1036, create content tags for one or more portions 1038, or otherwise edit the list of identified portions.

The podcast parsing application may display information associated with the compilation podcast, as shown illustratively by display region 1050. The exemplary compilation podcast displayed by the podcast parsing application in region 1050 includes four portions. The portions may each have an associated portion marker 1056, and associated seam markers 1054 at the beginning and end of each portion. The fourth portion, associated with portion marker "4" has been truncated in this example, conveyed by the asterisk in portion marker 1072. The specified play length of "25:00" minutes of the compilation could not accommodate the exemplary four portions in entirety. Portion marker 1057 may be displayed by the podcast parsing application with visual distinction from the other three portion markers to denote that portion "4" is truncated. The podcast parsing application may adjust the identified portions to the specified compilation play length using any suitable technique, such as truncating one or more portions, adjusting playback speed of one or more portions, extending or contracting the play length of the compilation, selecting portions with play lengths that cumulatively most closely match the specified compilation length, any other suitable technique or any combination thereof.

The podcast parsing application may display further commands such as those illustratively shown in the bottom part of region 1050. The podcast parsing application may display command buttons to add a portion 1060, delete a portion 1062, access further options 1064, tag the portions 1066, request additional information related to the portions or podcast parsing application 1068, and request help 1070 on one or more features of the podcast parsing application. In some embodiments, the podcast parsing application may receive user indication to add portions to the set of identified portions 1032, delete portions from the set of identified portions 1034, sort the identified portions based on one or more information fields 1036, create content tags for one or more portions 1038, or otherwise edit the list of identified portions. In displayed example screen 1000, the podcast parsing application has received user indication selecting portion "1" 1058 and command button "info" 1068. The podcast parsing application may display additional information regarding a portion in response to selection of portion "1" and a command button, as shown by display region 1080.

The podcast parsing application may display information associated with selected portion 1058 of a compilation podcast, as illustratively shown by display region 1080. In displayed example screen 1000, the selected portion, tagged as the NPR segment "Who's Carl This Time? [00:00-6:29]; Portion 1" is displayed during playback time 00:00 to 6:29, or the first six minutes and twenty nine seconds. The "Source" field in display region 1080 provides information on the base podcast from which the selected portion was derived.

Figure 11:
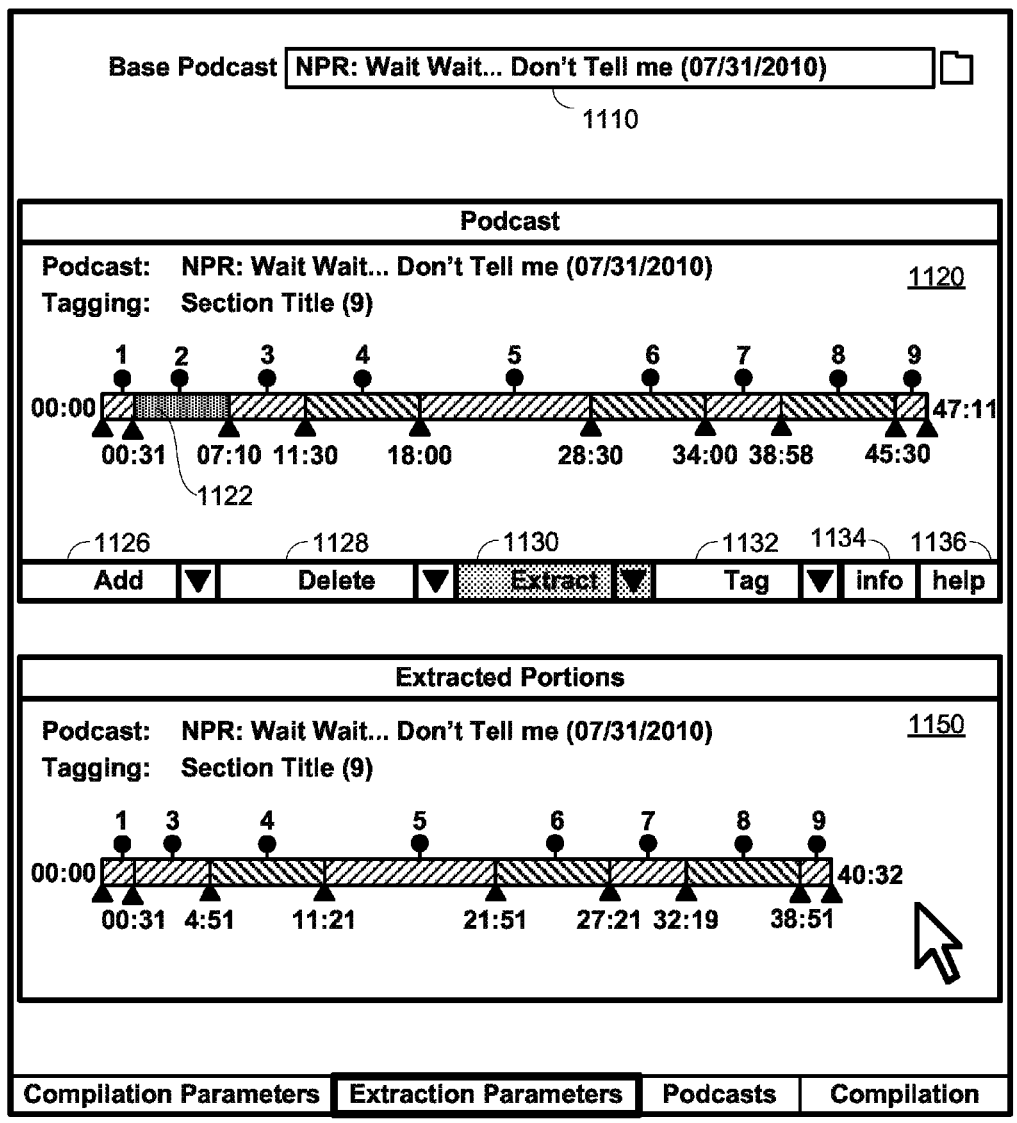
FIG. 11 shows an illustrative extraction parameter display interface in accordance with some embodiments of the present disclosure.

Shown in FIG. 11 is illustrative screen 1100, in accordance with some embodiments of the podcast parsing application. In some embodiments, example screen 1100 may correspond to or illustrate actions directed to extracting portions of podcast content as disclosed in FIG. 7. The podcast parsing application displays the text "NPR: Wait Wait . . . Don't Tell Me (Jul. 31, 2010)" in illustrative field 1110. In this example field 1110 displays the title of a base podcast identified by the podcast parsing application. In some embodiments, the podcast parsing application may display a representation of the base podcast in any format or arrangement. The base podcast shown illustratively in FIG. 11 includes nine portions, as shown by display region 1120. The podcast parsing application may display commands to add a marker (e.g., portion or seam marker) 1126, delete a marker (e.g., portion or seam marker) 1128, extract a portion 1130, tag a portion 1132, request additional information related to the portions or podcast parsing application 1134, and request help 1136 on one or more features of the podcast parsing application. In displayed example screen 1100, portion "2" 1122 is selected in display region 1120. Also selected is "Extract" command 1130 in display region 1120. It will be understood that the podcast parsing application may display information or metadata associated with portions of podcast content while performing any suitable action or combination of actions.

In some approaches, the podcast parsing application may receive user indication identifying portions to be extracted or excluded. In some approaches, the podcast parsing application may employ audio processing techniques, or social metrics to identify portions to be extracted or excluded. In some approaches, the podcast parsing application may exclude portions from being extracted or other further action. For example, the podcast parsing application may provide options to the user to identify portions that may be excluded or skipped during playback, as shown illustratively in display region 1150 of FIG. 1100. The podcast parsing application has received user indication to identified portion "2" 1122. The podcast parsing application has also received user indication to select the "Extract" command 1130. The "Extract" command button may include the option to exclude portion "2" from playback. In some embodiments, the podcast parsing application may provide portion seam markers or other indicators that may be selected or moved by the user to identify portions to be extracted or excluded. Any suitable commands or combination of commands for extracting or excluding podcast content may be provided or otherwise displayed by the podcast parsing application.

The podcast parsing application may display extracted portions of the base podcast, and may not display excluded portion "2", as shown illustratively by display region 1150. The seam markers have been readjusted in response to the exclusion of portion "2". In some approaches, the podcast parsing application may play the redacted podcast, excluding portion "2".

It will be understood that the previously discussed embodiments and examples are only illustrative of aspects of the podcast parsing application, and are not presented for purposes of limitation. It will be understood that various parsing, compiling, extracting, excluding and tagging techniques may be made available to the user and examples included herein are solely for convenience. Those skilled in the art will appreciate that the podcast parsing application may be practiced by other than the described embodiments, and the disclosure is limited only by the claims that follow.

What is claimed is:

1. A method for compiling podcast content, the method comprising:
   receiving a plurality of podcasts at a user device;
   for each of the plurality of podcasts:
      receiving, using processing equipment in the user device, from a podcast provider, a plurality of tags that provide a narrative description of one or more segments of the podcast; and
      storing, using the processing equipment in the user device, the tags as metadata corresponding to the podcast;
   receiving, using the processing equipment in the user device, an instruction to compile a collection of segments from the plurality of podcasts into a compilation podcast;
   examining a user profile for a user of the user device for one or more compilation parameters;
   selecting, using the processing equipment in the user device, a plurality of base podcasts from the plurality of podcasts based at least on the one or more compilation parameters;
   examining the user profile for the user of the user device for one or more extraction parameters;
   automatically identifying, using the processing equipment in the user device, one or more tagged-segments of the base podcasts to be included in the compilation podcast by comparing the extraction parameters with the tags;
   receiving a manual user input, from the user of the user device, to tag one or more segments of the base podcasts for inclusion into the compilation podcast wherein the one or more segments of the base podcasts have not been previously tagged; and
   generating, using the processing equipment in the user device, a compilation podcast based at least in part on the identified one or more tagged-segments and the manually tagged segments.

2. The method of claim 1, wherein the tags comprise user generated tags.

3. The method of claim 1, further comprising:
   receiving statistical parameters; and
   identifying, using the processing equipment, segments of the selected base podcasts based on the statistical parameters.

4. The method of claim 1, further comprising excluding one or more portions segments from the compilation podcast based at least in part on the extraction parameters.

5. The method of claim 1, wherein identifying the segments of the plurality of podcasts comprises using an audio processing technique.

6. The method of claim 1, further comprising:
   receiving, from the user of the user device, a manual user input to modify the tag of one or more segments of the base podcasts for inclusion into the compilation podcast.

7. A system for compiling podcast content, the system comprising:
- a communications network;
- a storage device storing podcast content in memory;
- a user access device coupled to the communications network and to the storage device, the user access device comprising processing equipment configured to:
  - receive a plurality of podcasts;
  - for each of the plurality of podcasts:
    - receive a plurality of tags that provide a narrative description of one or more segments of the podcast; and
    - store the tags as metadata corresponding to the podcast;
  - receive, an instruction to compile a collection of segments from the plurality of podcasts into a compilation podcast;
  - examine, a user profile for a user of the user device for one or more compilation parameters;
  - select, a plurality of base podcasts from the plurality of podcasts based at least on the one or more compilation parameters;
  - examine, the user profile for the user of the user device for one or more extraction parameters;
  - automatically identify, one or more tagged-segments of the base podcasts to be included in the compilation podcast by comparing the extraction parameters with the tags;
  - receive, from the user of the user device, a manual user input to tag one or more segments of the base podcasts for inclusion into the compilation podcast wherein the one or more segments of the base podcasts have not been previously tagged; and
  - generate a compilation podcast based at least in part on the identified one or more tagged-segments and the manually tagged segments; and
- a media output device for outputting the generated compilation podcast.

8. The system of claim 5, further comprising a user interface, wherein the processing equipment is further configured to receive one or more compilation parameters entered by a user in the user interface.

9. The system of claim 8, wherein the processing equipment is further configured to exclude one or more segments from the compilation podcast based at least in part on the extraction parameters.

10. The method of claim 1, wherein the one or more tags include user provided comments or keywords associated with the identified segments of the plurality of podcasts.

11. The method of claim 1, wherein the one or more tags include one or more user selectable predefined content tags.

12. The system of claim 5, wherein the system is further configured to:
- receive, from the user of the user device, a manual user input to modify the tag of one or more segments of the base podcasts for inclusion into the compilation podcast.

* * * * *

UNITED STATES PATENT AND TRADEMARK OFFICE
CERTIFICATE OF CORRECTION

| | | |
|---|---|---|
| PATENT NO. | : 8,812,498 B2 | Page 1 of 1 |
| APPLICATION NO. | : 12/892846 | |
| DATED | : August 19, 2014 | |
| INVENTOR(S) | : Michael I. Ingrassia et al. | |

It is certified that error appears in the above-identified patent and that said Letters Patent is hereby corrected as shown below:

In The Claims

In Claim 4, Column 24, line 59, please change "one or more portions segments from the compilation podcast" to -- one or more segments from the compilation podcast --.

In Claim 8, Column 26, line 10, please change "The system of claim 5, further comprising a user interface" to -- The system of claim 7, further compromising a user interface --.

In Claim 12, Column 26, line 24, please change "The system of claim 5, wherein the system is further" to -- The system of claim 7, wherein the system is further --.

Signed and Sealed this
Twenty-eighth Day of April, 2015

Michelle K. Lee
*Director of the United States Patent and Trademark Office*